United States Patent [19]

Majicek et al.

[11] 4,317,722
[45] Mar. 2, 1982

[54] WASTE SOLVENT RECOVERY APPARATUS

[75] Inventors: Stepan Majicek; Frank A. Fitz, both of San Jose, Calif.

[73] Assignee: Verbatim Corporation, Sunnyvale, Calif.

[21] Appl. No.: 112,113

[22] Filed: Jan. 14, 1980

[51] Int. Cl.³ .............................................. C02C 1/36
[52] U.S. Cl. ................................. 210/149; 210/177; 210/180; 210/187; 196/127
[58] Field of Search .............. 210/22 A, 85, 149, 177, 210/180, 187; 196/98, 99, 126, 127

[56] References Cited

U.S. PATENT DOCUMENTS

| | | | |
|---|---|---|---|
| 182,169 | 9/1876 | Cole | 196/127 |
| 1,690,060 | 11/1928 | Harrison | 210/85 |
| 2,345,595 | 4/1944 | Gerin | 196/127 |
| 4,062,770 | 12/1977 | Kneer | 210/149 X |
| 4,116,823 | 9/1978 | Choi | 196/127 X |

FOREIGN PATENT DOCUMENTS 1149628 12/1957 France ........................... 210/180

*Primary Examiner*—John Adee
*Attorney, Agent, or Firm*—Thomas E. Schatzel

[57] ABSTRACT

A waste solvent recovery apparatus to recover tetrahydratfuran (THF) from waste sludge. THF sludge enters the apparatus container through a sludge jet generally pointing in a downward direction. Steam is directed downwardly and at the THF waste sludge jet tending to vaporize the THF while solid contaminants fall to the bottom of the container. The flow rate of steam with respect to waste sludge is adjusted so that the temperature at the bottom of the container exceeds the boiling point of THF and the temperature at the top of the container is less than the boiling point of water.

10 Claims, 2 Drawing Figures

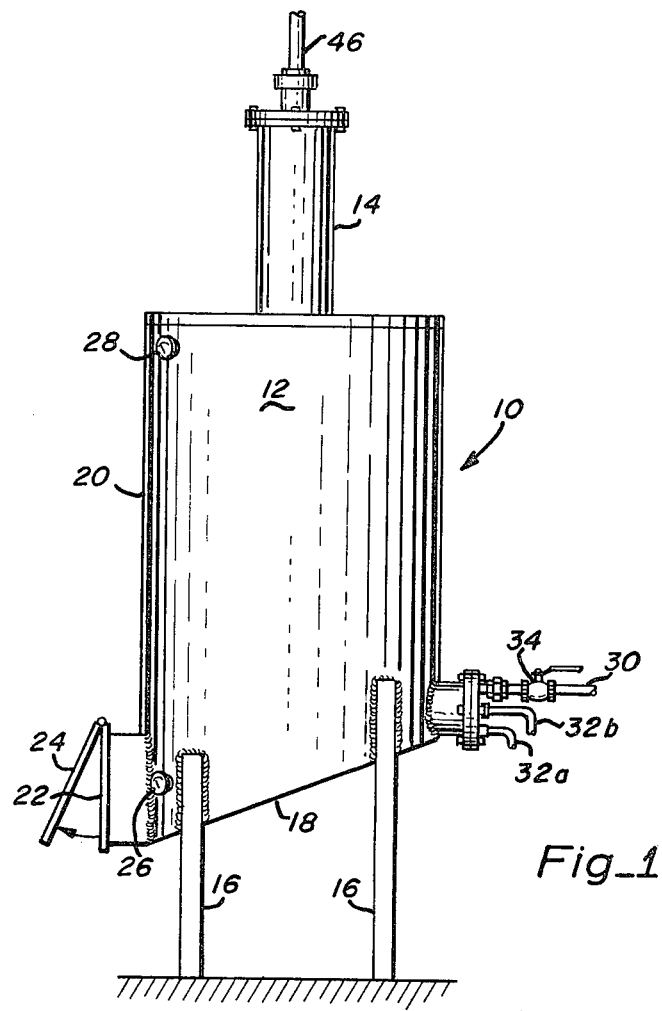
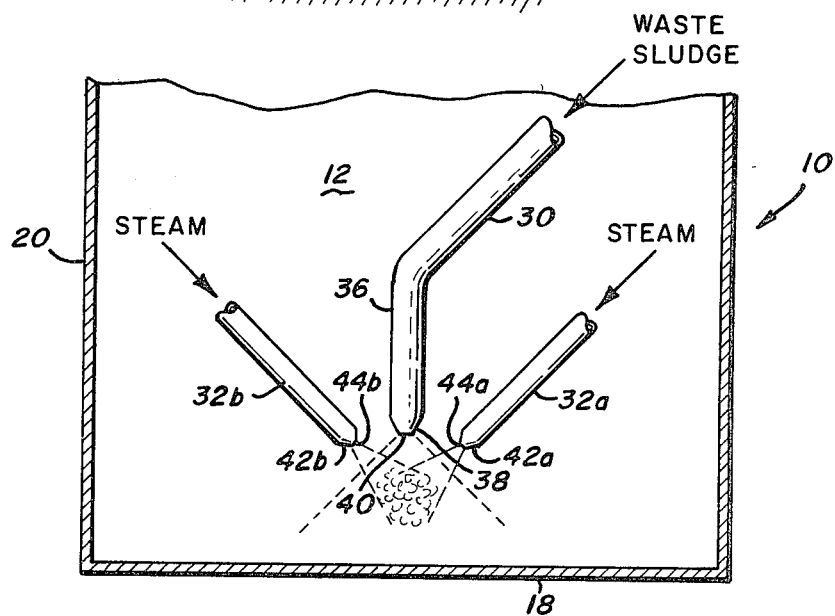

WASTE SOLVENT RECOVERY APPARATUS

BACKGROUND OF THE INVENTION

1. Field of the Invention

The invention relates to reclamation of relatively low boiling point solvents when such solvents are contaminated from prior use and/or manufacturing processing. In particular, the invention relates to the solvent recovery of tetrahydrafuran (THF) when formed with other particulate and chemical contaminants into a sludge-like waste product.

2. Description of the Prior Art

Many solvents of relatively low boiling point are utilized in manufacturing processes, and by their use they become contaminated commonly with particulates and other chemicals. Often such solvents are flammable, toxic, and dissolve many organic materials with which they come in contact. Thus, their disposition as a waste product presents serious problems from both an environmental and a waste-hauling standpoint. Moreover, many solvents are derived from hydrocarbon materials which are becoming increasingly expensive to procure, if available at all. Thus, a need exists to extract spent solvents which have become contaminated from waste materials and recycle such solvents back to relatively pure status.

In particular, THF is a solvent used in many industrial processes. In one instance, THF is utilized as a solvent carrier in the manufacture of magnetic recording media. In producing such magnetic recording media including flexible disks, cassettes, data recording cartridges, and other media devices, THF is mixed with other materials including iron oxide particles and resins to form a liquid within which such particles are evenly dispersed. This liquid is used for coating suitable substrates. In the coating process, relatively large filter housings hold the liquid or "ink" prior to being pumped into the coating station. Such filter housings retain a residue on the order of several gallons of ink per filling which is left as a sludge at the bottom of the container. In addition, THF is used as a solvent to clean parts on the magnetic media coating line. Thus, a significant amount of contaminated THF is generated often in the form of a thick slurry or so-called "slop".

In the prior art THF has been extracted from such "slop" by use of a container having hot water therein maintained at a temperature less than 100° C. (the boiling point of water) but greater than 66° C. (the boiling point of THF). Theoretically, the "slop" is supposed to contact the hot water and have the THF driven off in the form of vapors which can be collected and condensed to form a mixture of THF plus water. This liquid can thereafter be further purified by known techniques. In practice, this process is extremely inefficient. By its nature, the "slop" contains a significant quantity of binder material and cross linking material which is used in the formation of the magnetic media. When the binder and cross linking material hits the hot water, the temperature is high enough so that the binder cures and tends to encapsulate significant amounts of THF within small nodules. Efficiencies for this prior art process are in the range of 40% to 50% yield as a percentage of the total THF contained within the raw "slop".

SUMMARY OF THE INVENTION

It is thus an object of the present invention to provide an apparatus which can effectively remove solvent from waste sludge materials.

It is another object of the present invention to provide a solvent recovery apparatus which recovers virtually all of the solvent contained within the waste sludge.

It is yet another object of the present invention to provide a waste solvent recovery apparatus which is effective in the recovery of THF.

It is yet another object of the present invention to provide a waste solvent recovery apparatus which is inexpensive in capital outlay and simple to operate.

In a preferred embodiment according to the present invention, a cylindrical container is adapted to receive a jet of solvent laden sludge or "slop" and direct such jet in a generally downward direction. Into the stream of "slop" are directed a pair of steam jets. On top of the cylindrical container is a condenser and an exit orifice. In addition, in the lower portion of the container is a door for removal of waste particulates. In operation, waste "slop" is forced out of the "slop" orifice. The steam directed at the "slop" jet causes a fine particulate dustlike material to be generated which ends up as a residue at the bottom of the container. The THF is vaporized by the water vapor and rises into the condenser column on top of the container. The rate of "slop" entry into the container and the rate of steam flow is adjusted so that the temperature at the bottom of the container is greater than the boiling point of THF, and the temperature at the top of the container just below the condenser is less than the boiling point of water. The liquid effluent from the waste solvent recovery apparatus of the present invention is a mixture of water and THF.

It is thus an advantage of the present invention that THF may be recovered from waste "slop" in an efficient and inexpensive manner.

It is another advantage of the present invention that the apparatus disclosed herein has wide latitudes in its operating parameters making operation of the apparatus relatively uncritical.

It is yet another advantage of the present invention that the disclosed waste solvent recovery apparatus may recover a wide variety of solvents of different chemistry and contaminated in different ways.

It is yet another advantage of the present invention that the particulate solid biproduct of operation of the waste solvent recovery apparatus is simple to remove from the apparatus and can be easily disposed of, because it contains such a low percentage of toxic solvent therewithin.

These and other objects and advantages of the present invention will no doubt become apparent to those skilled in the art by referring to the following detailed description of a preferred embodiment and by reference to the several drawing figures.

BRIEF DESCRIPTION OF THE DRAWING

FIG. 1 is a perspective view of the waste solvent recovery apparatus of the present invention.

FIG. 2 is a view of the internal waste sludge and steam jets of the waste solvent recovery apparatus of the present invention.

DESCRIPTION OF THE PREFERRED EMBODIMENT

Referring to FIG. 1, a perspective view of a waste solvent recovery apparatus of the present invention is shown and referred to by the general reference character 10. Waste solvent recovery apparatus 10 is constructed from a container 12 generally of circular cross-section. Attached to the top of container 12 and approximately positioned concentric therewith is a condenser 14. Container 12 is supported upon level ground by a plurality of legs 16. As will be described in greater detail hereafter, a bottom surface 18 of container 12 is generally planar and inclined from the horizontal in order to assist in removal of solid residue particles which are produced as a result of operation of waste solvent recovery apparatus 10.

Container 12 has an outer cylindrical surface 20. Generally, in the area where bottom surface 18 interests cylindrical surface 20 is located an access port 22. Access port 22 permits solid wastes to be removed therethrough that are produced within container 12 during operation of waste solvent recovery apparatus 10. During operation of waste solvent recovery apparatus 10, access port 22 is closed by a door 24 which is secured in a closed position by conventional means. In addition to access port 22, a pair of thermometers 26 and 28 are located on cylindrical surface 20. Thermometer 26 is located generally near the bottom of container 12 with its temperature sensing end extending into container 12 so as to measure the internal temperature at the bottom of said container 12 when the waste solvent recovery apparatus 10 is in operation. Thermometer 28 is located generally near the top of container 12 with its temperature sensing end extending through cylindrical surface 20 to read the interior temperature at the top of container 12 when the waste solvent recovery apparatus 10 is in operation. The use of thermometers 26 and 28 will be described in greater detail hereafter.

Connected to the cylindrical surface 20 of container 12 generally opposite from access port 22 and door 24 are a plurality of supply tubes. A waste sludge supply tube 30 is so connected to cylindrical surface 20 in order to supply the waste sludge material containing the contaminated solvent to be recovered. In addition to waste sludge supply tube 30 are connected a pair of steam supply tubes 32a and 32b as shown in FIG. 1. As it is desirable to control the flow rate of steam with respect to waste sludge material, a valve 34 is positioned between waste sludge supply tube 30 and container 12 in order to regulate the flow of waste sludge material therethrough.

Referring to FIG. 2, an interior view of container 12 is shown in order to illustrate the disposition of the steam jets with respect to the waste sludge jet. Generally, waste sludge material is conducted through waste sludge supply tube 30 to a portion 36 of waste sludge supply tube 30 which is oriented in a vertical disposition as shown in FIG. 2. Portion 36 is terminated in a nozzle element 38 having an orifice 40 through which waste sludge material exists under pressure during operation of waste solvent recovery apparatus 10. Steam supply tubes 32a and 32b enter container 12 and extend into the vicinity of waste sludge supply tube 30 being terminated in the vicinity of nozzle 38. Steam supply tube 32a and 32b are disposed at approximately 45° angles with respect to the horizontal and steam emanates in a jet therefrom focused by a pair of nozzles 42a and 42b as shown in FIG. 2. Nozzles 42a and 42b have openings 44a and 44b, respectively, which form the shape of the steam jets.

In a working model constructed in accordance with the present invention, container 12 has an external diameter for cylindrical surface 20 of approximately 42 inches. The height of container 12 is generally 60 inches which creates an internal volume for container 12 of approximately 400 gallons. In addition, waste sludge orifice 40 has been constructed to have a circular opening approximately ⅛ of an inch in diameter, and steam orifices 44a and 44b have slotted openings approximately ⅛ of an inch wide by ¾ of an inch long. It has been found convenient moreover to incline surface 18 at an angle approximating 30° from the horizontal in order to easily remove solid biproducts from container 12 through access port 22 after operation of waste solvent recovery apparatus 10.

In operation of waste solvent recovery apparatus 10 when the solvent to be recovered is THF, it is required that the bottom of container 12 be maintained at a temperature in excess of 66°, that is, the boiling point of THF. In addition, it is required that the top portion of container 12 be maintained at a temperature less than 100° C., that is, the boiling point of water. Thus, at all times of operation for waste solvent recovery apparatus 10, thermometer 26 must read an excess of 66° C. and thermometer 28 must read less than 100° C. In practice, thermometer 26 is generally operated in the range of 75° C. and thermometer 28 is generally operated in the range of 90° C. While the general dimensions and physical positioning of components for waste solvent recovery apparatus 10 is uncritical, in order to efficiently operate waste solvent recovery apparatus 10 the temperatures should be maintained as discussed hereinabove. Thus, the flow rate of waste sludge with respect to steam is simply adjusted so that generally steam jets 42a and 42b have approximately equal flows, and the flow of waste sludge with respect to steam in general is adjusted to achieve the desired operational temperatures.

When the waste sludge exists from orifice 40 and contacts steam jets emanating from orifices 44a and 44b, a fine particulate material is formed which settles at the bottom of container 12 upon inclined surface 18. Water vapor and gaseous THF tend to rise within container 12 and enter condenser 14. The interior of condenser 14 in a working model in accordance with the present invention has been constructed from stainless steel packing materials in order to provide condensation sites for water. The exterior of condenser 14 has been constructed in the form of a right circular cylinder approximately 12 inches in diameter and 36 inches long concentric with container 12. The purpose of condenser 14 is to collect and remove as much water as possible from the gases flowing therethrough so that the exit gases from condenser 14 leaving through a port 46 shown in FIG. 1 will be primarily THF. In fact, it has been found that the actual gaseous output from condenser 14 through output port 46 is approximately 60% to 80% THF and 20% to 40% water. While that ratio of THF to water in the end product gaseous material through use of the present invention is approximately the same for prior art waste solvent recovery systems, the present invention has an efficiency of approximately 98% to 99% as opposed to an efficiency of some 40% to 50% for prior art waste solvent recovery systems. That is, the waste solvent recovery apparatus 10 permits reclamation of approximately 98 to 99% of the THF contained within the input waste sludge. The resulting solid waste ash is consequently so low in THF content that it may be disposed of without significant environmental problems.

While for the sake of clarity and in order to disclose the present invention so that the same can be readily understood, a specific embodiment has been described and illustrated, it is to be understood that the present invention is not limited to the specific means disclosed. It may be embodied in other ways that may suggest themselves to persons skilled in the art. For example, the shape of container 12 is not limited to a cylindrical cross-section, and it is not necessarily required that the attitude of the sludge and steam jets be in a generally vertical position. Moreover, a plurality of sludge jets and steam jets may be assembled in order to enhance certain applications of the waste solvent recovery apparatus 10. It is also conceivable that operation of waste solvent recovery apparatus 10 could be automated to the extent that the flow rates of the individual waste materials and steam could be controlled by electromagnetically actuated valves under guidance from a microprocessor wherein thermometers 26 and 28 provide the necessary input information for control of the process by the microprocessor according to certain algorithmic models. Moreover, the apparatus of the present invention as disclosed is not limited to the reclamation of THF as other solvents could easily be reclaimed in an apparatus employing a similar structure. It is believed that this invention is new and that all such changes that come within the scope of the following claims are to be considered as part of this invention.

We claim:

1. A waste solvent recovery apparatus comprising:
   a container having generally vertical side walls with an exit port for removal of solvent located generally near the top of said container;
   means for delivering a stream of sludge containing a concentration of a selected organic solvent into the container at a sludge entrance port displaced from said exit port;
   a gaseous material having a boiling point higher than that of said selected solvent and for flowing through the container;
   means for heating the gaseous material to a temperature greater than the boiling point of said selected solvent;
   means for directing said heated gaseous material into said stream of sludge as said stream is delivered to the container;
   means for measuring the temperature at locations within the container near the top and near the bottom; and
   means for maintaining the operating temperature within the container such that the temperature within the container is greater than the boiling point of said selected solvent, and the temperature near the bottom of the container is higher than the boiling point of the gaseous material while the temperature in the vicinity of said exit port is lower than the boiling point of the gaseous material.

2. The waste solvent recovery apparatus of claim 1, further comprising:
   a condenser located about the top of the container and connected to said exit port, the condenser being adapted to condense the gaseous material so as to increase the ratio of said selected solvent to the gaseous material in the effluent from the condenser.

3. The waste solvent recovery apparatus of claim 2, further comprising:
   an access port located generally at the bottom of the container along a vertical side wall of the container adapted to provide access to remove from the container the solid wastes created during operation of the waste solvent recovery apparatus, and
   a door adapted to seal the access port during operation of the waste solvent recovery apparatus.

4. The waste solvent recovery apparatus of claim 3, wherein
   the gaseous material, means for heating the gaseous material and means for maintaining the temperature are adapted for operation when said selected solvent is tetrahydrofuran (THF).

5. The waste solvent recovery apparatus of claim 3, wherein
   the gaseous material is steam when said selected solvent has a boiling point lower than that of water.

6. The waste solvent recovery apparatus of claim 3, wherein
   the container has a generally planar bottom surface inclined with respect to the horizontal with the access port located generally at the lowest point where said vertical side wall meets said planar bottom surface.

7. The waste solvent recovery apparatus of claim 6, wherein
   said certain vertical side walls are formed into a single circumferential cylindrical wall.

8. The waste solvent recovery apparatus of claim 1, wherein
   the means for delivering said stream of sludge is adapted to direct said stream into the container in a generally downward direction.

9. The waste solvent recovery apparatus of claim 8, wherein
   the means for directing the heated gaseous material into the container comprises a plurality of jets directed into said stream of sludge such that the direction of flow of the heated gaseous material is generally downward.

10. The waste solvent recovery apparatus of claim 1, wherein
    the means for maintaining the operating temperature within the container includes sludge flow control means for adjusting the rate of introduction into the container of said stream of sludge and gaseous flow control means for adjusting the rate of introduction into the container of the heated gaseous material.

* * * * *